(12) United States Patent
Chen et al.

(10) Patent No.: US 8,817,634 B2
(45) Date of Patent: Aug. 26, 2014

(54) METHOD AND DEVICE USED FOR FEEDBACK OF CHANNEL INFORMATION AND PRECODING

(75) Inventors: Jinhui Chen, Shanghai (CN); Dong Li, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 97 days.

(21) Appl. No.: 13/522,084

(22) PCT Filed: Jan. 13, 2010

(86) PCT No.: PCT/CN2010/070159
§ 371 (c)(1),
(2), (4) Date: Jul. 13, 2012

(87) PCT Pub. No.: WO2011/085549
PCT Pub. Date: Jul. 21, 2011

(65) Prior Publication Data
US 2012/0300702 A1    Nov. 29, 2012

(51) Int. Cl.
*H04L 12/26* (2006.01)
(52) U.S. Cl.
USPC ............ 370/241; 370/310; 455/63.1; 455/69
(58) Field of Classification Search
None
See application file for complete search history.

(56) References Cited

U.S. PATENT DOCUMENTS

| 8,498,358 | B2* | 7/2013 | Clerckx et al. | 375/267 |
| 8,588,799 | B2* | 11/2013 | Lv et al. | 455/450 |
| 2008/0317145 | A1* | 12/2008 | Clerckx et al. | 375/260 |
| 2009/0219838 | A1* | 9/2009 | Jia et al. | 370/278 |
| 2009/0268840 | A1* | 10/2009 | Clerckx et al. | 375/267 |
| 2009/0323849 | A1* | 12/2009 | Bala et al. | 375/267 |
| 2010/0238913 | A1* | 9/2010 | Xia et al. | 370/342 |
| 2011/0299622 | A1* | 12/2011 | Jian et al. | 375/295 |

FOREIGN PATENT DOCUMENTS

| CN | 101262311 A | 9/2008 |
| CN | 101369871 A | 2/2009 |
| CN | 101378277 A | 3/2009 |

OTHER PUBLICATIONS

International Search Report for PCT/CN2010/070159 dated Nov. 4, 2010.

* cited by examiner

*Primary Examiner* — Brian Roberts
(74) *Attorney, Agent, or Firm* — Fay Sharpe LLP

(57) ABSTRACT

The invention proposes a technical scheme (called as explicit feedback (used for feeding the information of downlink channels back to a base station at the user terminal of a wireless communication system, and a technical scheme for precoding the data transmitted to the user terminal based on the information of downlink channels feed back by the user terminal in the base station. The user terminal determines an approximately equivalent matrix of the transmission matrix of downlink channel, based on the transmission matrix of downlink channel, the number of downlink data streams, the spatial correlation matrix of multiple transmitting antennas in the base station and a predetermined codebook; then feeds the information concerning the approximately equivalent matrix back to the base station. The base station recovers the approximately equivalent matrix based on the information concerning the approximately equivalent matrix fed back from the user terminal, and precodes the downlink data transmitted to the user terminal by using the approximately equivalent matrix.

14 Claims, 12 Drawing Sheets

METHOD AND DEVICE USED FOR FEEDBACK OF CHANNEL INFORMATION AND PRECODING

TECHNICAL FIELD

The invention relates to method and device used for feedback channel information and precoding

BACKGROUND OF THE ARTS

In LTE-Advanced wireless communication system, for FDD MIMO system, in order to obtain higher efficiency of downlink frequency spectrum, the user terminal feeds precoding code words back to the base station for precoding the signals transmitted to the user terminal in the base station. The method is called as implicit feedback, that's, the user terminal determines precoding code words based on the transmission matrix of downlink channels and feed the code words back to the base station. Now, Intel, Huawei companies etc. have already proposed technical scheme of implicit feedback of carrying out first order correlation self-adaption by using the precoding codebook defined in the present standard. "Correlation self-adaption" means modifying the predefined codebook by using the spatial correlation matrix of downlink channels. "Order" means the number of data streams waiting for being transmitted in the base station. But this kind of technical schemes of implicit feedback is only suitable for the one-order condition. For multi-order condition, the system performance deteriorates rapidly. Thus, for multi-order FDD MIMO wireless communication system, a feasible feedback scheme of correlation self-adaption is urgently needed.

SUMMARY OF THE INVENTION

The invention proposes a technical scheme (called as explicit feedback) used for feeding back the information of downlink channels to a base station, at a user terminal, in a wireless communication system, and a technical scheme for precoding data transmitted to a user terminal based on the information of downlink channels, feed back by the user terminal, in the base station.

The inventive concept of the invention is that the user terminal feeds back the information of downlink channels to the base station based on the transmission matrix of the downlink channels from the base station and a spatial correlation matrix of multiple transmitting antennas in the base station. In the invention, the information of downlink channels is an approximately equivalent matrix of the transmission matrix from the base station to the user terminal.

According to an embodiment of the invention, a method is proposed that is used for feeding back information of downlink channel to the base station, at a user terminal, in a wireless communication network, wherein, the method comprises the following steps: obtaining a transmission matrix of downlink channel from the base station to the user terminal; determining an approximately equivalent matrix of the transmission matrix of downlink channel, based on the transmission matrix of downlink channel, the number of downlink data streams, the spatial correlation matrix of multiple transmitting antennas in the base station and a predetermined codebook; and feeding back information concerning the approximately equivalent matrix to the base station.

In an embodiment, the user terminal determines an equivalent matrix of the transmission matrix of downlink channel, based on the transmission matrix of downlink channel and the number downlink data streams, the equivalent matrix is a two-dimensional $m \times N_t$ matrix, wherein, m is the number of downlink data streams, and $N_t$ is the number of transmitting antennas in the base station; then determining the approximately equivalent matrix based on the equivalent matrix, the number of downlink data streams, the spatial correlation matrix and the predetermined codebook, the approximately equivalent matrix is a two-dimensional $m \times N_t$ matrix.

In an embodiment, the user terminal implements singular value decomposition to the transmission matrix H of downlink channel to obtain $H = U \Sigma V^H$, then obtains the first m row vectors of the conjugated and transport matrix $V^H$ of the right-side singular matrix V, obtained from the singular value decomposition, as the equivalent matrix $\tilde{H}$, $$\tilde{H} = \begin{pmatrix} v_1^H \\ \vdots \\ v_m^H \end{pmatrix};$$

Or obtaining the product of the first m row vectors of conjugated and transport matrix $V^H$ of right-side singular matrix V, obtained from singular value decomposition, and a diagonal matrix $\Sigma_m$ composed of m×m components of the first m columns and m rows of the diagonal matrix $\Sigma$, as the equivalent matrix $\tilde{H}$, $$\tilde{H} = \begin{pmatrix} v_1^H \\ \vdots \\ v_m^H \end{pmatrix}.$$

In an embodiment, the user terminal determines the approximately equivalent matrix $\tilde{\tilde{H}}$ according to the following expression: $\tilde{\tilde{H}} = W_k^T R$, wherein, R is the spatial correlation matrix of the multiple transmitting antennas in the base station, $W_k^T$ denotes the transposition of matrix $W_k$, $$W_k = \mathrm{argmax}_{W_k} \frac{\mathrm{trace}\{\mathrm{abs}(\tilde{H} R W_i^*)\}}{\|R W_i^*\|_F},$$

wherein, $W_i$ is the code word of the predetermined codebook and is a two-dimensional $N_t \times m$ matrix, $W_i^*$ denotes the conjugation of matrix $W_i$, $\mathrm{abs}(\tilde{H} R W_i^*)$ denotes the module of each component of matrix $\tilde{H} R W_i^*$, $\mathrm{trace}\{\mathrm{abs}(\tilde{H} R W_i^*)\}$ denotes the trace of matrix $\mathrm{abs}(\tilde{H} R W_i^*)$, $\|R W_i^*\|_F$ denotes the Frobenius norm of matrix $R W_i^*$, and $\tilde{H}$ is the equivalent matrix.

According to another embodiment of the invention, a method is proposed for precoding the downlink data transmitted to a user terminal, at the base station, in a wireless communication network, wherein, the method comprises the following steps: receiving from the user terminal information concerning an approximately equivalent matrix of the transmission matrix of downlink channel from the base station to the user terminal; determining the approximately equivalent matrix based on the information concerning the approximately equivalent matrix, a predetermined codebook and a spatial correlation matrix of multiple transmitting antennas in the base station; and precoding downlink data transmitted to the user terminal by using the approximately equivalent matrix.

In an embodiment, the information concerning the approximately equivalent matrix comprises a subscript of the code word of the predetermined codebook, the base station determines the approximately equivalent matrix according to $\tilde{H}=W_k^T R$, wherein, R is the spatial correlation matrix of the multiple transmitting antennas in the base station, k is the subscript of the code word of the predetermined codebook fed back by the user terminal, and $W_k$ is the code word of the predetermined codebook.

In an embodiment, the base station implements singular value decomposition to the approximately equivalent matrix, then precodes the downlink data transmitted to the user terminal by selecting the first m column vectors of right-side singular matrix as the precoding matrix, wherein m is the number of downlink data streams.

According to another embodiment of the invention, a feedback device is proposed for feeding back the information of downlink channels to a base station, at a user terminal, in a wireless communication network, comprising: an obtaining component, configured to obtain a transmission matrix of downlink channels from the base station to the user terminal; a first determining component, configured to determine an approximately equivalent matrix of the transmission matrix of downlink channel, based on the transmission matrix of downlink channel, number of downlink data streams, a spatial correlation matrix of multiple transmitting antennas in the base station and a predetermined codebook; and an information feedback component, configured to feed back information concerning the approximately equivalent matrix to the base station.

According to another embodiment of the invention, a precoding device is proposed for precoding downlink data transmitted to a user terminal, at the base station, in a wireless communication network, comprising: a receiver, configured to receive from the user terminal the information concerning an approximately equivalent matrix of the transmission matrix of downlink channel from the base station to the user terminal; a fourth determining component, configured to determine the approximately equivalent matrix based on the information concerning the approximately equivalent matrix, a predetermined codebook and a spatial correlation matrix of multiple transmitting antennas in the base station; and an encoding component, configured to precode downlink data transmitted to the user terminal by using the approximately equivalent matrix.

Compared to the present wireless communication system using precoding with fixed codebooks and self-adaption codebooks of implicit feedback, the wireless communication system using the technical scheme of the invention obtains obvious gains, and the system block error rate decreases significantly.

In the invention, since a user terminal feeds back an approximately equivalent matrix of the transmission matrix of downlink channels, that's explicit feedback, a base station determines by its own will the precoding scheme based on the approximately equivalent matrix, thus the base station may uses all kinds of precoding schemes flexibly. Moreover, according to an embodiment of the invention, the predetermined codebook uses the codebook defined in present LTE release 8, and keeps good backward compatibility and lower computation complexity, therefore the realization of the system is easier.

BRIEF DESCRIPTION OF THE FIGURES

By reading the detailed description to the unlimited embodiments by referring to the following figures, other features, purposes and merits of the invention will be more obvious.

Wherein, the same or similar reference signs indicate the same or similar step feature or component (module).

DETAILED EMBODIMENT

The following is the detailed exemplary description of concrete embodiments of the invention by referring to the figures.

Figure 1:
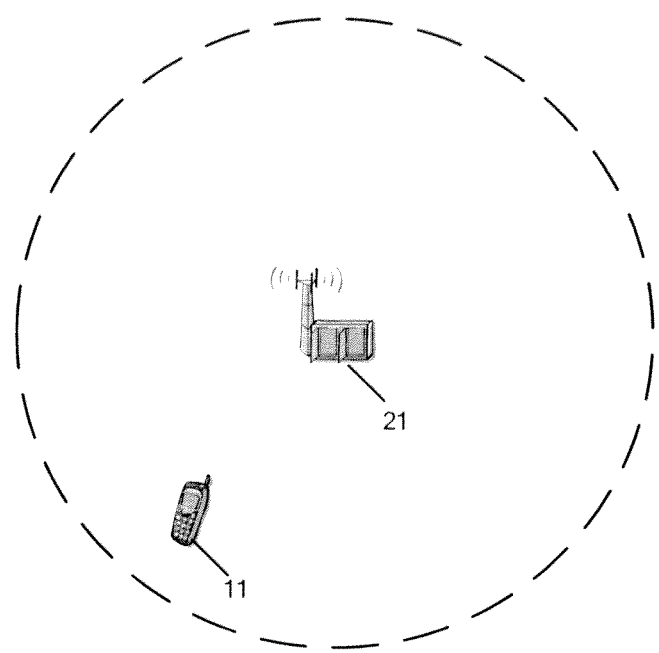
FIG. 1 is the applied scene view of wireless communication network according to a detailed embodiment of the invention.

FIG. 1 is the applied scene view of a wireless communication network according to a detailed embodiment of the invention, wherein, there are $N_t$ transmitting antennas in a base station 21, $N_t$ is greater than 1; there are $N_r$ transmitting antennas in a user terminal 11, $N_r$ is greater than 1; The uplink and downlink channels between the user terminal 11 and the base station 21 are asymmetric channels, the base station 21 precodes the data transmitted to the user terminal 11 based on the information of downlink channel fed back by the user terminal 11 and then transmits it to the user terminal 11.

Figure 2:
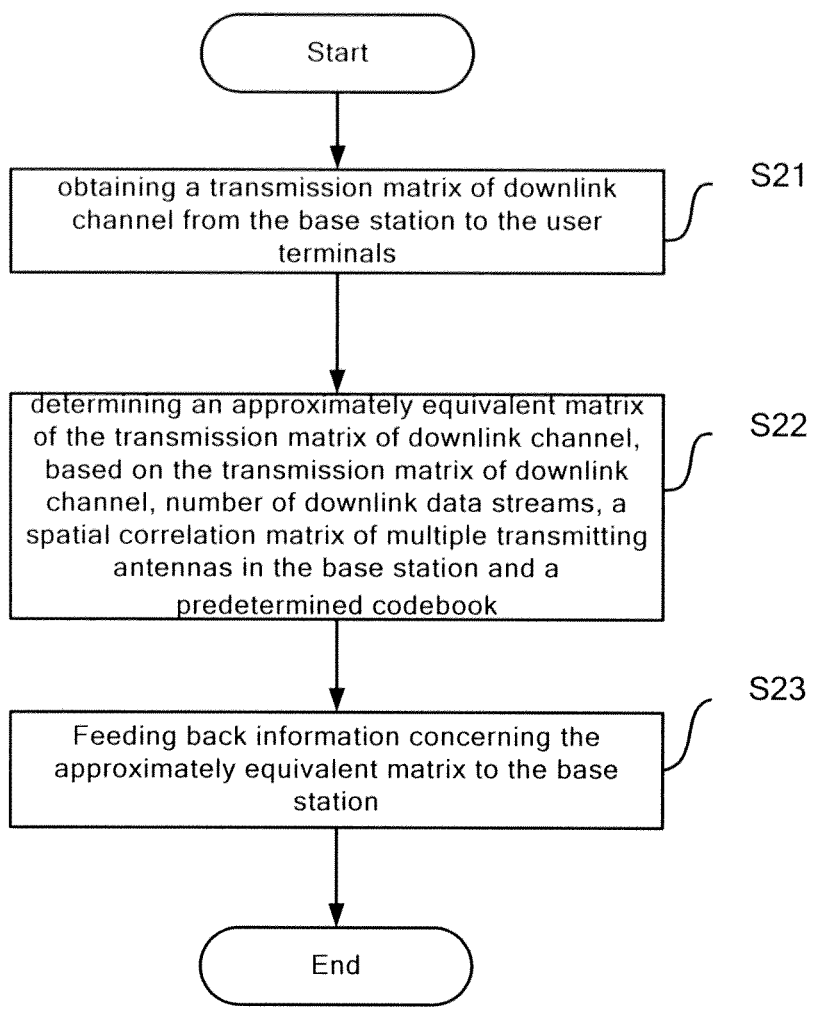
FIG. 2 is the flowchart of the method, used in a user terminal of a wireless communication network, for feeding back information of downlink channel to the base station according to a detailed embodiment of the invention.

FIG. 2 illustrates the flowchart of the method, used in a user terminal of a wireless communication network, for feeding back information of downlink channel to the base station according to a detailed embodiment of the invention. The following is the detailed description of the flow in FIG. 2 in conjunction with the applied scene illustrated in FIG. 1.

First, in step 21, the user terminal 11 obtains the transmission matrix H of downlink channel from the base station 21 to the user terminal 11, H is a two-dimensional $N_r \times N_t$ matrix. Usually, the user terminal 11 estimates the channel based on the downlink signals received from the base station 21, to obtain the transmission matrix of downlink channel. Concretely, how to estimate channels is a very mature technique in the field and may refer to <Digital Communications> wrote by John G. Proakis, and it's unnecessary to go into details.

Next, in step 22, the user terminal 11 determines an approximately equivalent matrix $\tilde{\tilde{H}}$ of the transmission matrix of downlink channel, based on the transmission matrix of downlink channel from the base station 21 to the user terminal 11, the number m of downlink data streams, the spatial correlation matrix R of multiple transmitting antennas in the base station 21 and a predetermined codebook.

The number of downlink data streams means the number of data symbols for which the base station precedes in the period of a transmission symbol, this may be configured by the wireless communication system in advance or dynamically determined by the base station based on the conditions of real-time channel conditions.

In an embodiment, the user terminal 11 determines the spatial correlation matrix based on the transmission matrix H of downlink channel from the base station 21 to the user terminal 11, that's $R=E[H^H \cdot H]$, R may be the average value of multiple time points and/or multiple sub-carriers. In another embodiment, the user terminal 11 may directly obtains from the base station 21 the spatial correlation matrix R of multiple transmitting antennas in the base station 21. The spatial correlation matrix R of multiple transmitting antennas in the base station 21 is a physical quantity slowly varied with time, thus, the user terminal 11 may update the spatial correlation matrix R at a longer period, e.g. 100 ms.

Figure 3:
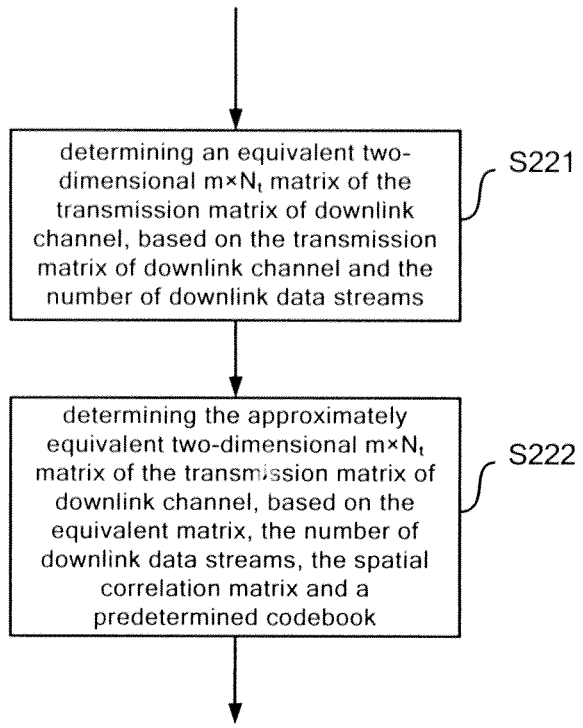
FIG. 3 is the sub-steps flowchart of step S22 showed in FIG. 2 according to a detailed embodiment of the invention.

In an embodiment, the step S22 comprises the substeps S221 and S222 illustrated in FIG. 3.

First, in step 2221, the user terminal 11 determines an equivalent matrix $\tilde{H}$ of the transmission matrix of downlink channel, based on the transmission matrix H of downlink channel and the number m of downlink data streams, $\tilde{H}$ is a two-dimensional $m \times N_t$ matrix.

Figure 4:
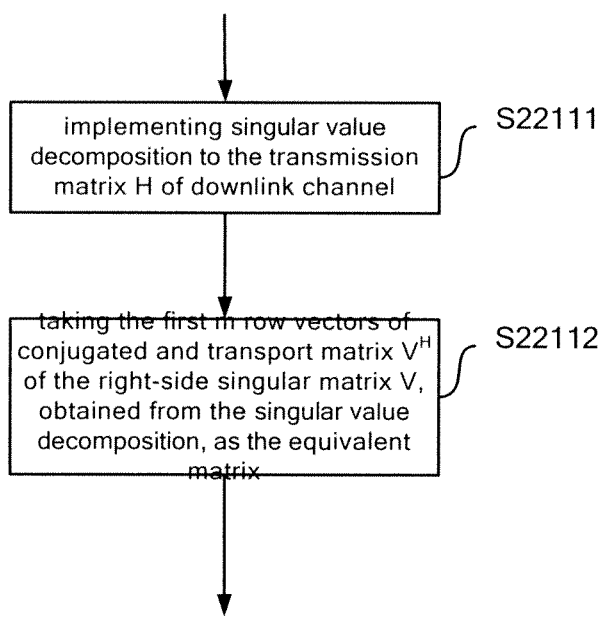
FIG. 4 is the sub-steps flowchart of step S221 showed in FIG. 3 according to a detailed embodiment of the invention.

According to an embodiment of the invention, the step 2221 comprises the two substeps S22111 and S22112 illustrated in FIG. 4.

First, in step S22111, the user terminal 11 implements a singular value decomposition to the transmission matrix H of downlink channel from the base station 21 to the user terminal 11: $H = U\Sigma V^H$.

Next, in step S22112, the user terminal 11 obtains the first m row vectors of conjugated and transport matrix $V^H$ of the right-side singular matrix V, obtained from the singular value decomposition, as the equivalent matrix $\tilde{H}$, that's $$\tilde{H} = \begin{pmatrix} v_1^H \\ \vdots \\ v_m^H \end{pmatrix} \quad (1)$$

Figure 5:
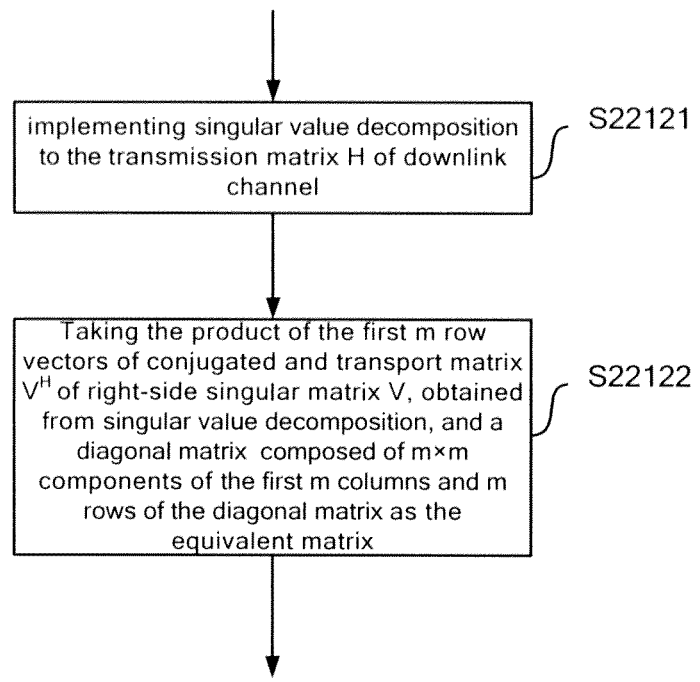
FIG. 5 is the sub-steps flowchart of step S221 showed in FIG. 3 according to another detailed embodiment of the invention.

According to another embodiment of the invention, the step S221 comprises the two substeps S22121 and S22122 illustrated in FIG. 5.

Here, the step S22121 is the same as S22111, the user terminal 11 implements singular value decomposition to the transmission matrix H of downlink channel from the base station 21 to the user terminal 11: $H = U\Sigma V^H$.

Next, in step S22122, the user terminal 11 obtains the product of the first m row vectors of conjugated and transport matrix $V^H$ of right-side singular matrix V, obtained from singular value decomposition, and a diagonal matrix $\Sigma_m$ composed of m×m components of the first m columns and m rows of the diagonal matrix $\Sigma$, as the equivalent matrix $\tilde{H}$, that's $$\tilde{H} = \begin{pmatrix} v_1^H \\ \vdots \\ v_m^H \end{pmatrix} \quad (2)$$

Back to the FIG. 3, in step S222, the user terminal 11 determines the approximately equivalent matrix $\tilde{\tilde{H}}$ of the transmission matrix of downlink channel, according to the equivalent matrix $\tilde{H}$ of the transmission matrix of downlink channel obtained in step S221, the number m of downlink data streams, the spatial correlation matrix R of multiple transmitting antennas in the base station 21 and a predetermined codebook.

According to an embodiment of the invention, the predetermined codebook uses the feedback codebook defined in LTE release 8, that's PMI codebook, and determines the approximately equivalent matrix $\tilde{\tilde{H}}$ of the transmission matrix of downlink channel according to the following expression:

$$\tilde{\tilde{H}} = W_k^T R \quad (3)$$

Wherein, R is the spatial correlation matrix of the multiple transmitting antennas in the base station, $W_k^T$ denotes the transposition of matrix $W_k$, wherein, $W_k$ is determined according to the following expression:

$$W_k = \operatorname{argmax}_{wk} \frac{\operatorname{trace}\{\operatorname{abs}(\tilde{H} R W_i^*)\}}{\|R W_i^*\|_F} \quad (4)$$

Wherein, $W_i$ is the code word of the predetermined codebook and is a two-dimensional $N_t \times m$ matrix, $W^*_i$ denotes the conjugation of matrix $W_i$, $\operatorname{abs}(\tilde{H} R W^*_i)$ denotes module of each component of matrix $\tilde{H} R W^*_i$, $\operatorname{trace}\{\operatorname{abs}(\tilde{H} R W^*_i)\}$ denotes the trace of matrix $\operatorname{abs}(\tilde{H} R W^*_i)$, $\|R W^*_i\|_F$ denotes the Frobenius norm of matrix $R W^*_i$, and $\tilde{H}$ is the equivalent matrix obtained in step S221 as illustrated in the expression (1) and expression (2).

The meaning of the expression (4) is that the code word $W_k$ is the one letting $$\frac{\operatorname{trace}\{\operatorname{abs}(\tilde{H} R W_i^*)\}}{\|R W_i^*\|_F}$$

obtain the maximum value.

Back to the FIG. 2, in step S203, the user terminal 11 feeds back the information concerning the approximately equivalent matrix $\tilde{\tilde{H}}$ determined in step S202 to the base station 21.

As illustrated by the expression (3), in the above embodiments, the base station 21 knows its spatial correlation matrix R of multiple transmitting antennas and prestores the above predetermined codebook, the user terminal 11 only needs feeding the subscript k of the code word $W_k$ back to the base station 21, that is to say: the information concerning the approximately equivalent matrix $\tilde{\tilde{H}}$ is the subscript k of the code word $W_k$.

It needs to express that the predetermined codebook is not limited to the above PMI codebook defined in LTE release 8, and other types of codebooks may be applied in the invention, e.g. the codebook defined in IEEE802.16m standard.

The ordinary skilled in this art should understand that, depending on different specific method for determining the approximately equivalent matrix of the transmission matrix of downlink channel from the base station 21 to the user terminal 11, the specific information comprised by the information concerning the approximately equivalent matrix $\tilde{\tilde{H}}$ is different correspondingly. In an embodiment, one principle of feeding back the information concerning the approximately equivalent matrix $\tilde{\tilde{H}}$ is: making the bit overhead used by feedback minimum.

Figure 6:
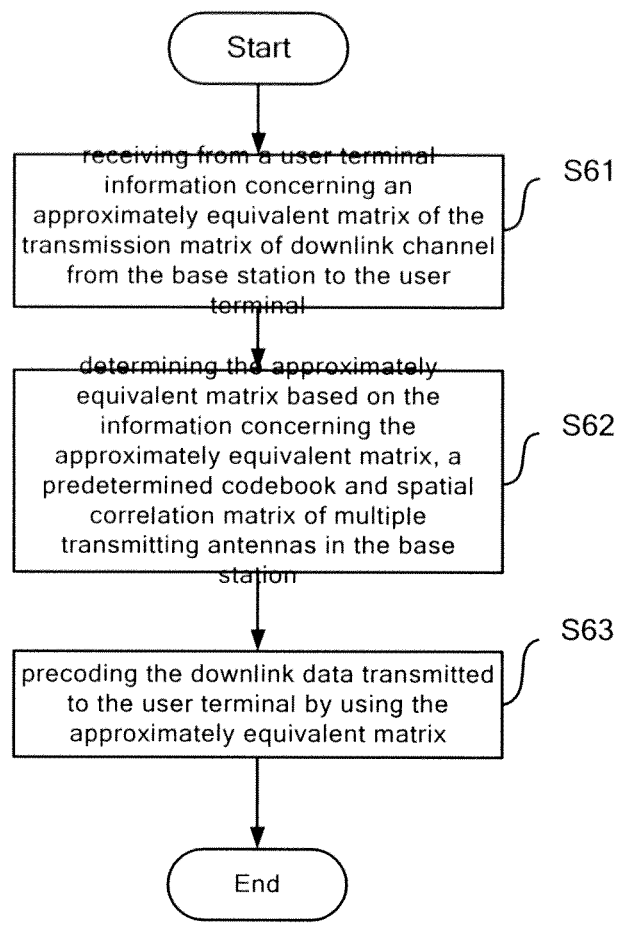
FIG. 6 is the flowchart of the method, used in a base station of a wireless communication network, for precoding downlink data transmitted to a user terminal according to a detailed embodiment the invention.

FIG. 6 is the flowchart of the method, used in the base station of a wireless communication network, for precoding downlink data transmitted to a user terminal according to a detailed embodiment of the invention. The following is the detailed description of the flow in FIG. 6 in conjunction with the applied scene illustrated in FIG. 1.

First, in step S61, the base station 21 receives from the user terminal 11 the information concerning an approximately equivalent matrix of the transmission matrix of downlink channel from the base station 21 to the user terminal 11. As the embodiments illustrated in the above expression (3) and expression (4), the information concerning the approximately equivalent matrix comprises the subscript of the code word of the predetermined codebook. In an embodiment, the predetermined codebook uses the feedback codebook defined in LTE release 8, that's the PMI codebook.

Next, in step S62, the base station 21 determines the approximately equivalent matrix based on the information concerning the approximately equivalent matrix received in step S61, the predetermined codebook and the spatial correlation matrix of multiple transmitting antennas in the base station 21. Corresponding to the embodiments illustrated in the above expression (3) and expression (4), the base station 21 determines the approximately equivalent matrix of the transmission matrix of downlink channel from the base station 21 to the user terminal 11 according to the expression (3).

Finally, in step S63, the base station 21 precedes the downlink data transmitted to the user terminal 11 by using the approximately equivalent matrix obtained in step S62.

Figure 7:
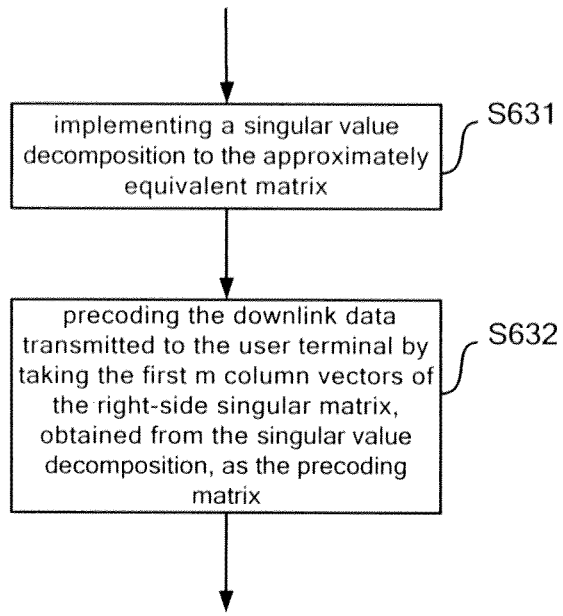
FIG. 7 is the sub-steps flowchart of step S63 showed in FIG. 6 according to a detailed embodiment of the invention.

In an embodiment, the step S63 comprises the substeps S631 and S632 of the step S63 illustrated in FIG. 7.

First, in step S631, the base station 21 implements a singular value decomposition to the approximately equivalent matrix and obtains $\tilde{\tilde{H}} = U_w \Sigma_w V_w^H$. According to the embodiments illustrated in the expression (3) and expression (4), $\tilde{\tilde{H}}$ is a two-dimensional $m \times N_t$ matrix, $U_w$ is a $m \times m$ unitary matrix, $\Sigma_w$ is a $m \times N_t$ diagonal matrix, $V_w^H$ is a $N_t \times N_t$ unitary matrix, $V_w$ is a $N_t \times N_t$ unitary matrix too.

Next, in step S632, the base station 21 precodes the downlink data transmitted to the user terminal 11 by taking the first m column vectors of the right-side singular matrix $V_w$, obtained from the singular value decomposition, as the precoding matrix, that is to say: the precoding matrix P of the base station 21 is: $P = (v_w^1 \ldots v_w^m)$, wherein, $v_w^i$ is the column vector of the matrix $V_w$, $i = 1, \ldots, m$. Let the downlink data streams be $$Sym = \begin{pmatrix} s_1 \\ \vdots \\ s_m \end{pmatrix},$$

then it is obtained that the signal to be transmitted on each antennas is $$S = P \times Sym = (v_w^1 \quad \ldots \quad v_w^m) \cdot \begin{pmatrix} s_1 \\ \vdots \\ s_m \end{pmatrix},$$

S is $N_t \times 1$ matrix.

It needs to explain that the flow illustrated in FIG. 7 is just an embodiment, since what the user terminal 11 feeds back is an equivalent matrix of transmission matrix of downlink channel from the user terminal 11 to the base station 21, instead of the indicator of the precoding code word, the base station 21 may independently determines the precoding scheme, e.g. the base station 21 may precodes the downlink data transmitted to the user terminal 11 based on the approximately equivalent matrix of transmission matrix of downlink channel from the base station 21 to the user terminal 11 and using the MET method etc. The detailed information about MET precoding may refer to the technical document R1-070318, "Link-level Results for Multiuser Eigenmod Transmission with Limited Feedback" discussed in LTE-A.

Figure 8:
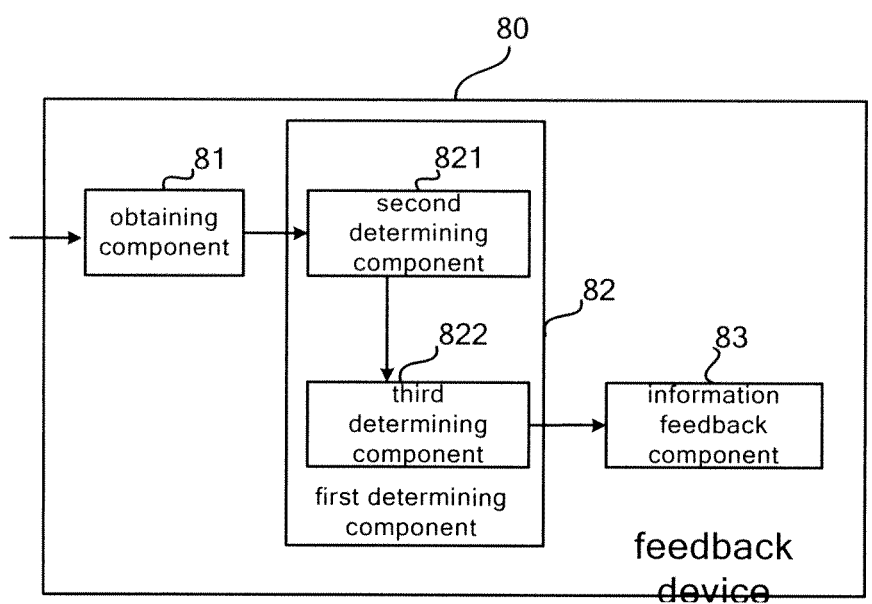
FIG. 8 is the structural block diagram of the feedback device used at a user terminal of a wireless communication network for feeding back the information of downlink channels to the base station according to a detailed embodiment of the invention.

FIG. 8 is the structural block diagram of the feedback device, used in a user terminal of a wireless communication network, for feeding back information of downlink channels to the base station according to a detailed embodiment of the invention. In FIG. 8, the feedback device 80 comprises an obtaining component 81, a first determining component 82, and an information feedback component 83. In an embodiment, the first determining component 82 comprises the second determining component 821 and the third determining component 822.

The following is the detailed description of working process of the feedback device 80 in the user terminal 11 in conjunction with the applied scene illustrated in FIG. 1.

First, the obtaining component 81 obtains the transmission matrix H of downlink channel from the base station 21 to the user terminal, H is a $N_r \times N_t$ two-dimensional matrix. Usually, the user terminal 11 estimates the channel based on the downlink signals received from the base station 21 to obtain the transmission matrix of downlink channel. Concretely, how to estimate channels is a very mature technique in the art and may refer to <Digital Communications> wrote by John G. Proakis, and it's unnecessary to go into details.

Next, the first determining component 82 determines an approximately equivalent matrix $\tilde{\tilde{H}}$ of the transmission matrix of downlink channel, based on the transmission matrix of downlink channel from the base station 21 to the first determining component 82, the number m of downlink data streams, the spatial correlation matrix R of multiple transmitting antennas in the base station 21 and a predetermined codebook.

The number of downlink data streams means the number of data symbols for which the base station precedes in the period of a transmission symbol, and this may be configured by the wireless communication system in advance or dynamically determined by the base station according to the real time channels conditions.

In an embodiment, the obtaining component 81 determines the spatial correlation matrix based on the transmission matrix H of downlink channel from the base station 1 to the user terminal, that's $R = E[H^H \cdot H]$, R may be the average value of multiple time points and/or multiple sub-carriers. In another embodiment, the obtaining component 81 obtains from the base station 21 the spatial correlation matrix R of multiple transmitting antennas in the base station 21. The spatial correlation matrix R of multiple transmitting antennas in the base station 21 is a physical quantity slowly varied with time, thus, the obtaining component 81 may update the spatial correlation matrix R at a longer period, e.g. 100 ms.

In an embodiment, the function of the first determining component 82 is implemented by its two sub-components which are the second determining component 821 and the third determining component 822.

First, the second determining component 821 determines an equivalent matrix $\tilde{H}$ of the transmission matrix of downlink channel, based on the transmission matrix H of downlink channel and the number m of downlink data streams, $\tilde{H}$ is a two-dimensional $m \times N_t$ matrix.

According to an embodiment of the invention, the second determining component 821 implements singular value decomposition to the transmission matrix H of downlink channel from the base station 21 to the user terminal: $H = U \Sigma V^H$.

Next, the second determining component 821 obtains the first m row vectors of conjugated and transport matrix $V^H$ of the right-side singular matrix V, obtained from the singular value decomposition, as the equivalent matrix $\tilde{H}$, as the expression (1) illustrated.

According to another embodiment of the invention, the second determining component 821 obtains the product of the first m row vectors of conjugated and transport matrix $V^H$ of right-side singular matrix V, obtained from singular value decomposition, and a diagonal matrix $\Sigma_m$ composed of $m \times m$ components of the first m columns and m rows of the diagonal matrix $\Sigma$, as the equivalent matrix $\tilde{H}$, as the expression (2) illustrated.

Next, the third determining component 822 determines the approximately equivalent matrix $\tilde{\tilde{H}}$ of the transmission matrix of downlink channel, based on the equivalent matrix $\tilde{H}$ of the transmission matrix of downlink channel obtained in the obtaining component 81, the number m of downlink data streams, the spatial correlation matrix R of multiple transmitting antennas in the base station 21 and a predetermined codebook.

According to an embodiment of the invention, the predetermined codebook uses the feedback codebook defined in LTE release 8, that's PMI codebook, and the third determining component 822 determines the approximately equivalent matrix $\tilde{\tilde{H}}$ of the transmission matrix of downlink channel according to the above expression (3).

Finally, the feedback device 83 feeds back the information concerning the approximately equivalent matrix $\tilde{\tilde{H}}$ determined by the first determining component 82 to the base station 21.

As the expression (3) illustrated, in the above embodiments, the base station 21 knows its spatial correlation matrix R of multiple transmitting antennas and prestores the above predetermined codebook, the information feedback device 83 only needs to feed the subscript k of the code word $W_k$ back to the base station 21, that is to say: the information concerning the approximately equivalent matrix $\tilde{\tilde{H}}$ is the subscript k of the code word $W_k$.

The ordinary skilled in this art should understand that, M depending on different detailed method of determining the approximately equivalent matrix of the transmission matrix of downlink channel from the base station 21 to the user terminal 11, the detailed information comprised by the information concerning the approximately equivalent matrix $\tilde{\tilde{H}}$ is different correspondingly. In an embodiment, one principle of feeding back the information concerning the approximately equivalent matrix $\tilde{\tilde{H}}$ is: making the bit overhead used by feedback minimum.

Figure 9:
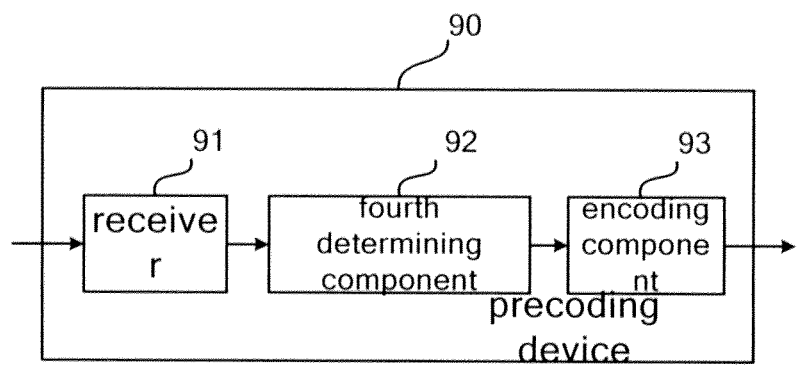
FIG. 9 is the structural block diagram of the precoding device used at a base station of a wireless communication network for precoding downlink data transmitted to the user terminal according to a detailed embodiment of the invention.
Figure 10:
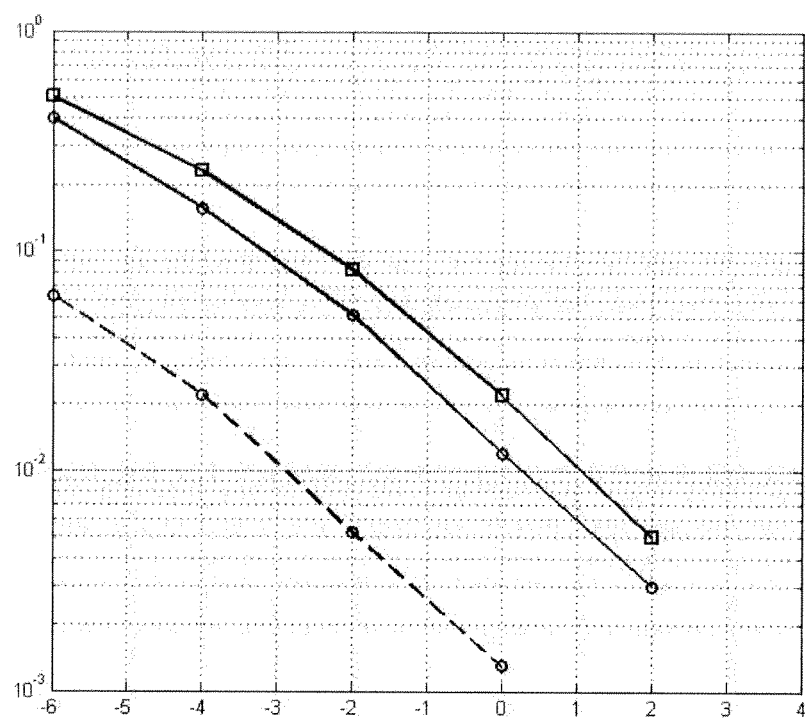
FIG. 10 illustrates the block error rate and signal to noise ration diagram of the wireless communication network, which uses the ITU-UMi channel model, and in which the span of transmitting antennas in the station is 0.5 times as wavelength, the travel rate is 3 Km/h, user terminals have two transmitting antennas, code rate is ½, QPSK modulation is used and the transmitting data stream is 1.
Figure 11:
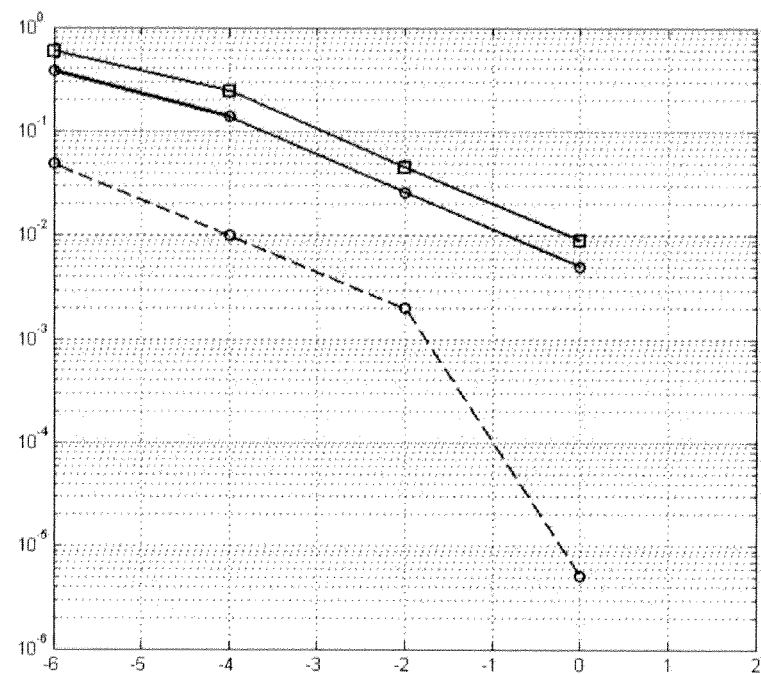
FIG. 11 illustrates the block error rate and signal to noise ration diagram of the wireless communication network, which uses the ITU-UMi channel model, and in which the span of transmitting antennas in the station is 4 times as wavelength, the travel rate is 3 Km/h, user terminals have two transmitting antennas, code rate is ½, QPSK modulation is used and the transmitting data stream is 1.
Figure 12:
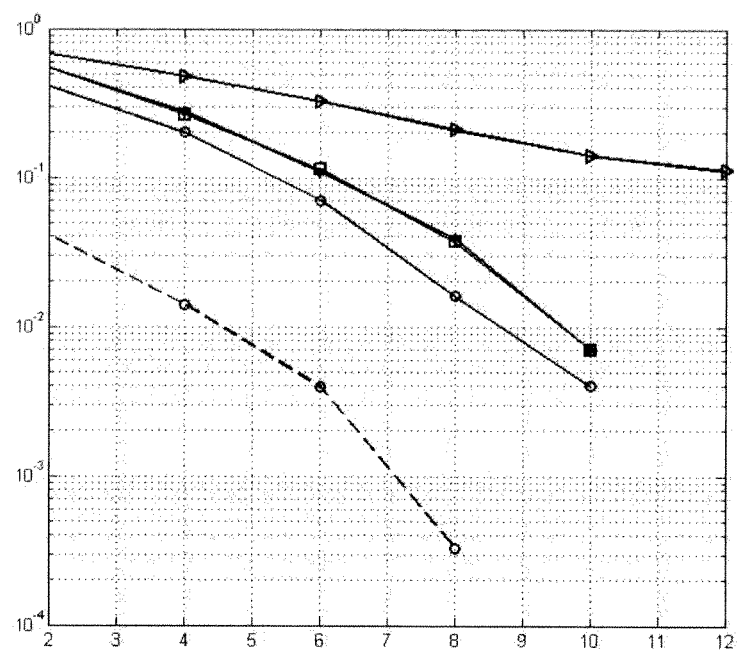
FIG. 12 illustrates the block error rite and signal to noise ration diagram of the wireless communication network which uses the ITU-UMi channel model, and in which the span of transmitting antennas in the station is 0.5 times as wavelength, the travel rate is 3 Km/h, user terminals have two transmitting antennas, code rate is ½, QPSK modulation is used and the transmitting data streams are 2.
Figure 13:
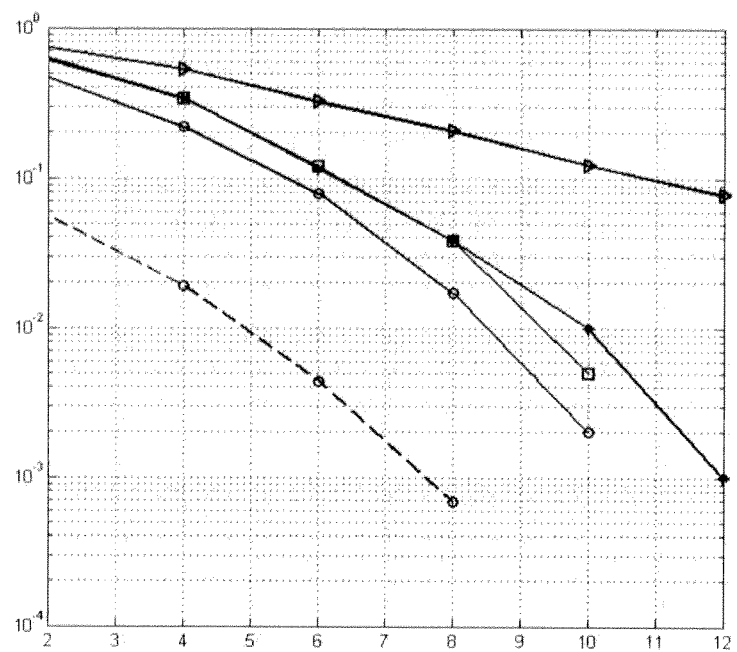
FIG. 13 illustrates the block error rate and signal to noise ration diagram of the wireless communication network which uses the ITU-UMa channel model, and in which the span of transmitting antennas in the station is 0.5 times as wavelength, the travel rate is 3 Km/h, user terminals have two transmitting antennas, code rate is ½, QPSK modulation is used and the transmitting data streams are 2.
Figure 14:
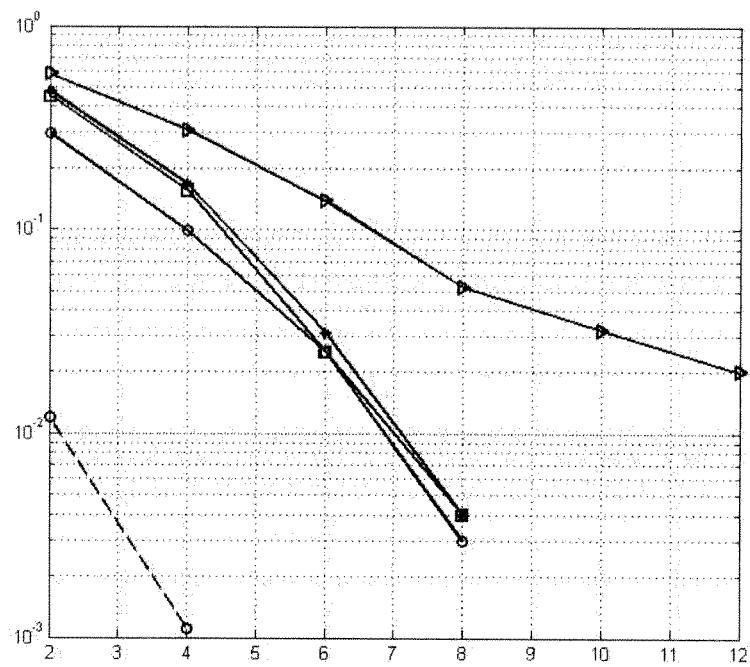
FIG. 14 illustrates the block error rate and signal to noise ration diagram of the wireless communication network which uses the ITU-UMi channel model, and in which the span of transmitting antennas in the station is 4 times as wavelength, the travel rate is 3 Km/h, user terminals have two transmitting antennas, code rate is ½, QPSK modulation is used and the transmitting data streams is 2.
Figure 15:
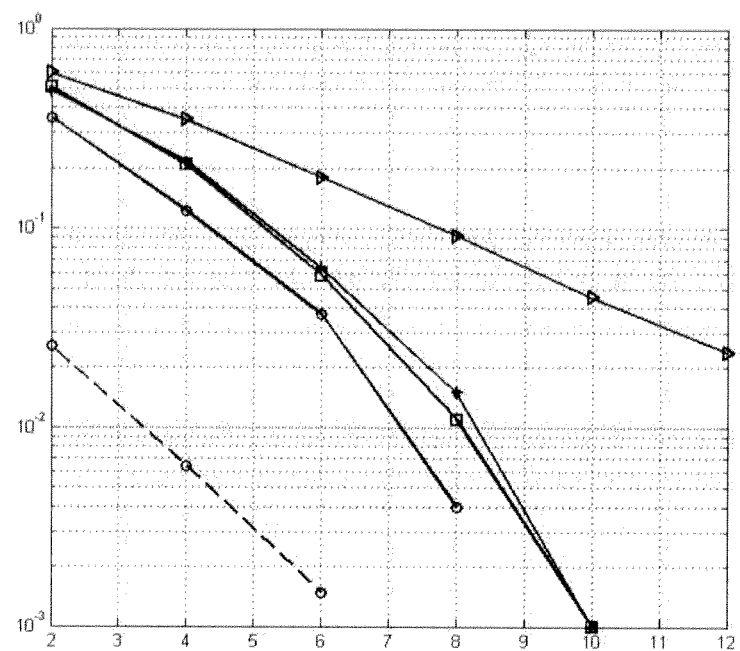
FIG. 15 illustrates the block error rate and signal to noise ration diagram of the wireless communication network which uses the ITU-UMa channel model, and in which the span of transmitting antennas in the station is 4 times as wavelength, the travel rate is 3 Km/h, user terminals have two transmitting antennas, code rate is ½, QPSK modulation is used and the transmitting data streams is 2.
Figure 16:
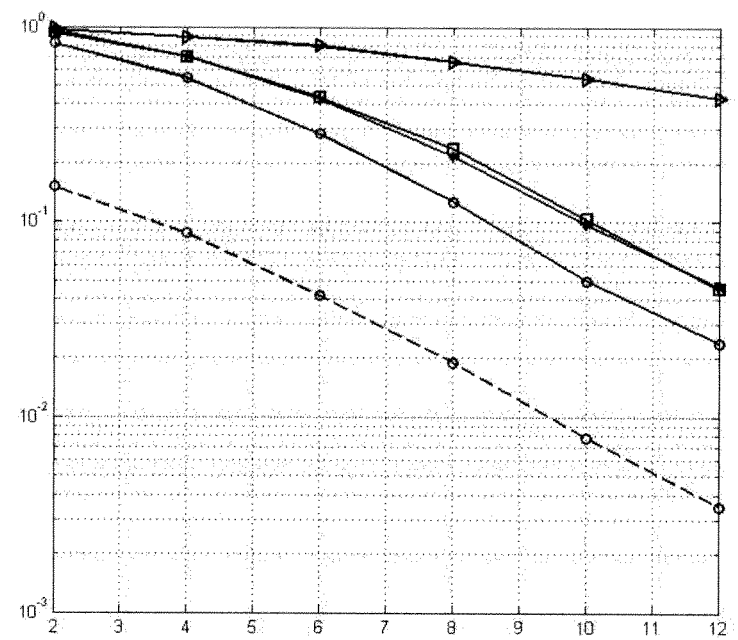
FIG. 16 illustrates the block error rate and signal to noise ration diagram of the wireless communication network which uses the ITU-UMi channel model, and in which the span of transmitting antennas in the station is 0.5 times as wavelength, the travel rate is 3 Km/h, user terminals have three transmitting antennas, code rate is ½, QPSK modulation is used and the transmitting data streams is 3.
Figure 17:
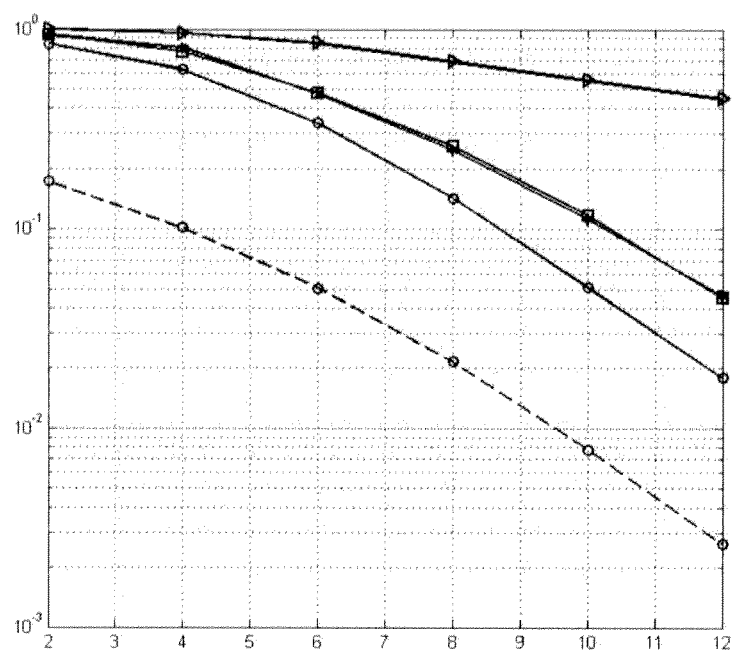
FIG. 17 illustrates the block error rate and signal to noise ration diagram of the wireless communication network which uses the ITU-UMa channel model, and in which the span of transmitting antennas in the station is 0.5 times as wavelength, the travel rate is 30 Km/h, user terminals have three transmitting antennas, code rate is ½, QPSK modulation is used and the transmitting data streams is 3.
Figure 18:
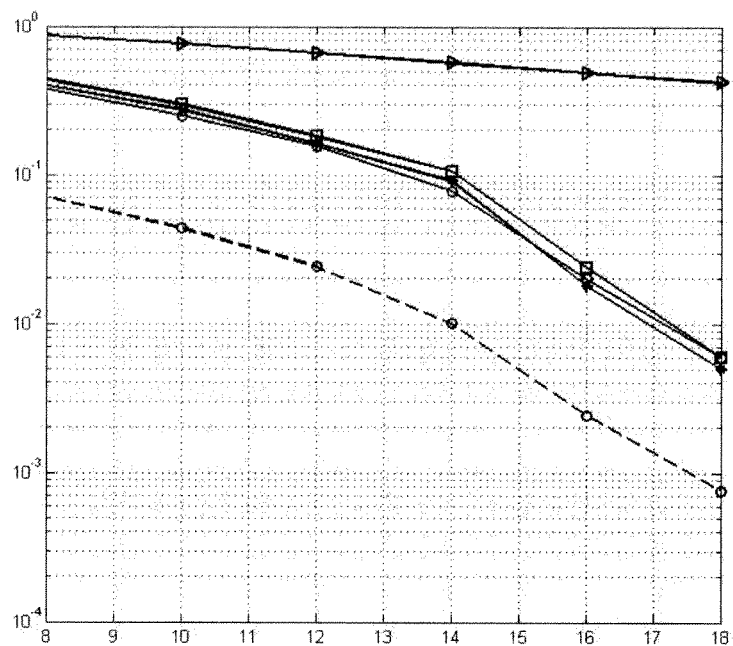
FIG. 18 illustrates the block error rate and signal to noise ration diagram of the wireless communication network which uses the ITU-UMi channel model, and in which the span of transmitting antennas in the station is 0.5 times as wavelength, the travel rate is 3 Km/h, user terminals have four transmitting antennas, code rate is ½, QPSK modulation is used and the transmitting data streams is 4.
Figure 19:
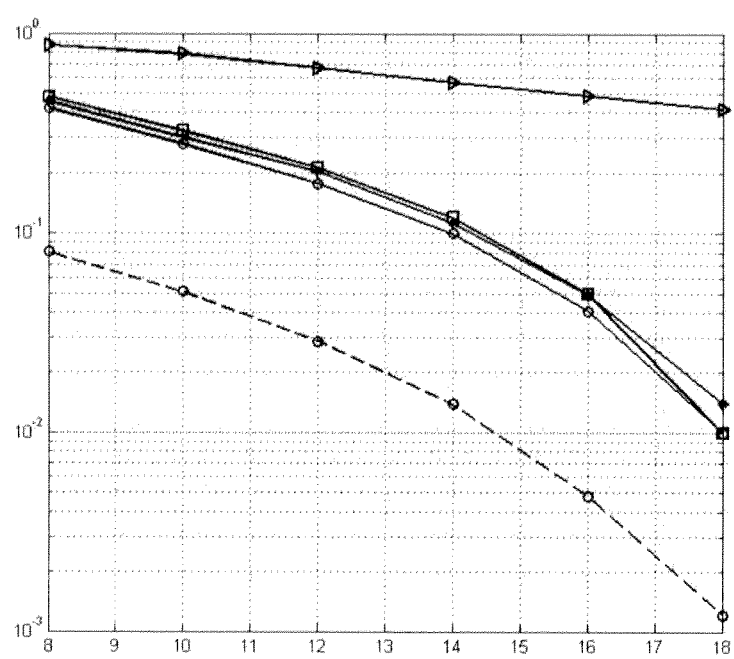
FIG. 19 illustrates the block error rate and signal to noise ration diagram of the wireless communication network which uses the ITU-UMa channel model, and in which the span of transmitting antennas in the station is 4 times as wavelength, the travel rate is 30 Km/h, user terminals have four transmitting antennas, code rate is ½, QPSK modulation is used and the transmitting data streams is 4.

FIG. 9 is the structural block diagram of the precoding device 90, used in the base station of wireless communication network, for precoding downlink data transmitted to the user terminal according to a detailed embodiment of the invention. The precoding device 90 comprised the receiver 91, the fourth determining component 92 and the encoding component 93.

The following is the detailed description of working process of the precoding device 90 in the base station 21 in conjunction with the applied scene illustrated in FIG. 1.

First, the receiver 91 receives from the user terminal 11 the information concerning an approximately equivalent matrix of the transmission matrix of downlink channel from the base station 21 to the user terminal 11. As the embodiments illustrated in the above expression (3) and expression (4), the information concerning the approximately equivalent matrix comprises the subscript of the code word of the predetermined codebook. In an embodiment, the predetermined codebook uses the feedback codebook defined in LTE release 8, that is the PMI codebook.

Next, the fourth determining component 92 determines the approximately equivalent matrix based on the information concerning the approximately equivalent matrix received in the receiver 91, the predetermined codebook and the spatial correlation matrix of multiple transmitting antennas in the base station 21. Corresponding to the embodiments illustrated in the above expression (3) and expression (4), the base station 21 determines the approximately equivalent matrix of the transmission matrix of downlink channel from the base station 21 to the user terminal 11 according to the expression (3).

Finally, the encoding component 93 precodes the downlink data transmitted to the user terminal 11 by using the approximately equivalent matrix determined by the fourth determining component 92.

In an embodiment, the detailed working process of the encoding component 93 is described as the following.

First, the encoding component 93 implements singular value decomposition to the approximately equivalent matrix and obtains $\tilde{\tilde{H}} = U_w \Sigma_w V_w^H$. According to the embodiments illustrated in the expression (3) and expression (4), $\tilde{\tilde{H}}$ is a two-dimensional $m \times N_t$ matrix, $U_w$ is a $m \times m$ unitary matrix, $\Sigma_w$ is a $m \times N_t$ diagonal matrix, $V_w^H$ is a $N_t \times N_t$ unitary matrix, $V_w$ is a $N_t \times N_t$ unitary matrix too.

Next, the encoding component 93 precodes the downlink data transmitted to the user terminal 11 by taking the first m column vectors of the right-side singular matrix $V_w$, obtained from the singular value decomposition, as the precoding matrix, that is to say the precoding matrix P of the base station 21 is: $P = (v_w^1 \ldots v_w^m)$, wherein, $v_w^i$ is the column vector of the matrix $V_w$, $i = 1, \ldots, m$. Let the downlink data streams be $$Sym = \begin{pmatrix} s_1 \\ \vdots \\ s_m \end{pmatrix},$$

then it is obtained that the signal of each antennas to be transmitted which is $$S = P \times Sym = (v_w^1 \ldots v_w^m) \cdot \begin{pmatrix} s_1 \\ \vdots \\ s_m \end{pmatrix},$$

S is a $N_t \times 1$ matrix.

It needs to explain that the working process of the encoding component 93 described above is just an example, since what the user terminal 11 feeds back is an equivalent matrix of transmission matrix of downlink channel from the base station 21 to the user terminal 11 instead of the indicator of precoding code word, the encoding component 93 may independently determines precoding scheme, e.g. the encoding component 93 may precode the downlink data transmitted to the user terminal 11 based on the approximately equivalent matrix of transmission matrix of downlink channel from the encoding component 93 to the user terminal 11 and using MET method etc. The detailed information about MET precoding may refer to the technical document R1-070318, "Link-level Results for Multiuser Eigenmod Transmission with Limited Feedback" discussed in LTE-A.

The above is detailed description of the embodiments of each method and component of the invention.

There is an example concerning the MIMO wireless communication system of single user, which compares and analyzes performance of the technical scheme of self-adaption codebook and explicit feedback of the invention, the technical scheme of self-adaption codebook and implicit feedback of the present technique, the technical scheme of fixed codebook and explicit feedback, the technical scheme of fixed codebook and implicit feedback, and the technical scheme of implementing SVD decomposition based on ideal channel information.

Without loss of generality, there are four transmitting antennas in the base station 21, two to four transmitting antennas in the user terminal 11, and the predetermined codebook uses the feedback codebook defined in LTE release 8, i.e. the PMI codebook. The simulation channel uses the ITU channel model, and the detailed simulation parameters are illustrated as the following.

TABLE 1

Table of the simulation parameters

| Parameter name | Value |
| --- | --- |
| Transmission scheme | SVD SU-MIMO of first to fourth order |
| Number of base stations and antennas configuration | One base station with four antennas which span 0.5 times or four times as wavelength |
| Number of user terminals and antennas configuration | One user terminal with two to four antennas which span 0.5 times as wavelength |
| Modulation scheme | QPSK |
| Channel encoding | ½ Turbo encoding |
| Feedback delay of channel status information(CSI) | 0 ms |
| Delay of matrix report related with transmitter | 0 ms |
| Quantization scheme of matrix related with transmitter | Ideal |
| Transmission resource | 5 LTE PRBs (Primary Resource Block) in frequency domain |
| Channel evaluation | Ideal |
| Data detection | MMSE |
| rate | 3 kmph or 30 kmph |
| Channel model of fast fading | ITU channel model, UMi (Urban Micro) or UMa (Urban Macro) |

TABLE 1-continued

Table of the simulation parameters

| Parameter name | Value |
|---|---|
| Large scale channel model | No loss model |
| Simulation frames | 1000 |
| Block size | 584 bits |
| Predetermined codebook | 3GPP LTE Rel −8 4 bits codebook for 4Tx |

The FIG. 10 to FIG. 19 respectively illustrate the relation diagram of signal to noise ratio and bit error ratio of the above four technical schemes and ideal SVD decomposition scheme under different parameter values, wherein, the horizontal axis means signal to noise ratio(SNR), the unit is dB, and the vertical axis means block error ratio (BLER), the unit is percentage; The legend line with circles means the technical scheme of self-adaption codebook and explicit feedback of the invention, the legend line with triangles means the technical scheme of self-adaption codebook and implicit feedback of the present technique, the legend line with squares means the technical scheme of fixed codebook and explicit feedback of present technique, the legend line with rhombuses means the technical scheme of fixed codebook and implicit feedback of present technique, and the legend dotted line with circles means the technical scheme of implementing SVD decomposition based on ideal channel information.

The table 2 illustrates the signal to noise ratio of each technical scheme when the block error ratio is 0.1.

TABLE 2 the signal to noise ratio when the block error ratio is 0.1.

| System parameters | self-adaption codebook explicit feedback | self-adaption codebook implicit feedback | fixed codebook explicit feedback | fixed codebook implicit feedback |
|---|---|---|---|---|
| transmitting data stream is 1, UMi channel model, transmitting antennas span 0.5 times as wavelength | −3.2 dB | −3.2 dB | −2.4 dB | −2.4 dB |
| transmitting data stream is 1, UMi channel model, transmitting antennas span 4 times as wavelength | −3.4 dB | −3.4 dB | −3 dB | −3 dB |
| transmitting data streams are 2, UMi channel model, transmitting antennas span 0.5 times as wavelength | 5.4 dB | 12 dB | 6.2 dB | 6.2 dB |
| transmitting data streams are 2, UMa channel model, transmitting antennas span 0.5 times as wavelength | 5.5 dB | 11 dB | 6.4 dB | 6.4 dB |
| transmitting data streams are 2, UMi channel model, transmitting antennas span 4 times as wavelength | 4 dB | 6.8 dB | 4.5 dB | 4.6 dB |
| transmitting data stream are 2, UMa channel model, transmitting antennas span 4 times as wavelength | 4.4 dB | 7.8 dB | 5.2 dB | 5.3 dB |
| transmitting data streams are 3, UMi channel model, transmitting antennas span 0.5 times as wavelength | 8.5 dB | Greater than 12 dB | 10 dB | 10 dB |
| transmitting data streams are 3, UMa channel model, transmitting antennas span 0.5 times as wavelength | 8.8 dB | Greater than 12 dB | 10.3 dB | 10.3 dB |
| transmitting data streams are 4, UMi channel model, transmitting antennas span 0.5 times as wavelength | 13.5 dB | Greater than 18 dB | 14.2 dB | 14 dB |
| transmitting data streams are 4, UMa channel model, transmitting antennas span 0.5 times as wavelength | 14 dB | Greater than 18 dB | 14.5 dB | 14.4 dB |

Seen from the FIG. 10 to FIG. 19, compared with the present technical schemes, the technical scheme of self-adaption codebook and explicit feedback of the invention has the lowest block error ratio under the same signal to noise ration, or the lowest signal to noise ratio under the same block error ratio.

In the above embodiments, the precoding for one user terminal is based on the approximately equivalent matrix of the transmission matrix of downlink channel from the base station to that user terminal, thus it is a single user MIMO (SU-MIMO) case. In the art, it is well known that the information about the transmission matrix of downlink channel from the base station to that user terminal, together with the information about the transmission matrix of downlink channel from the base station to other user terminals, can be considered in precoding, namely realizing multi-user MIMO (MU-MIMO). Therefore, it can be reasonably deduced that the invention can be applied in the MU-MIMO case.

Specifically, in a varied embodiment, as to the method in the eNB, the steps S61 and S62 are further executed for each of at least one other user terminal, and the step S63 precodes the downlink data transmitted to the user terminal with the approximately equivalent matrix of the terminal and further with the approximately equivalent matrix of each of said at least one other user terminal.

As to the components in the eNB, the receiver 91 is further configured to receive from each of at least one other user terminal the information concerning an approximately equivalent matrix of the transmission matrix of downlink channel from the base station to that user terminal. The fourth determining component 92 is further configured to determine, respectively for each of the at least one other user terminal, a approximately equivalent matrix based on the information concerning the approximately equivalent matrix, a predetermined codebook and a spatial correlation matrix of multiple transmitting antennas in the base station. And the encoding component 93 is further configured to precode the downlink data transmitted to the user terminal with the approximately equivalent matrix of the terminal and further with the approximately equivalent matrix of each of said at least one other user terminal.

It needs to explain that the above embodiments are only demonstrations, not the limitation to the invention. Any technical solution not deviating from the spirit of the invention should be within the scope of protection of the invention. In addition, any reference signs in the claims shouldn't be taken as limitations to the claims related; The word "comprises" doesn't exclude the components or steps not listed in other claims or specifications; "a" before component doesn't exclude existence of multiple snatch components; In the devise comprising many components, one or multiple functions of the multiple components may be realized by one hardware or software module; The words "the first", "the second", "the third" etc only mean names, not any special orders.

What is claimed is:

1. A method for feeding back information of downlink channels to a base station, at a user terminal, in a wireless communication network, the method comprising:
    obtaining a transmission matrix of downlink channels from the base station to the user terminal;
    determining an approximately equivalent matrix of the transmission matrix of downlink channels based on the transmission matrix of downlink channels, a number of downlink data streams, a spatial correlation matrix of multiple transmitting antennas in the base station, and a predetermined codebook, wherein, the number of downlink data streams is m and there are $N_t$ transmitting antennas in the base station;
    determining an equivalent matrix of the transmission matrix of downlink channels based on the transmission matrix of downlink channels and the number of downlink data streams, the equivalent matrix being a two-dimensional m×$N_t$ matrix;
    determining the approximately equivalent matrix based on the equivalent matrix, the number of downlink data streams, the spatial correlation matrix, and the predetermined codebook, the approximately equivalent matrix being a two-dimensional m×$N_t$ matrix;
    feeding back information concerning the approximately equivalent matrix to the base station.

2. The method of claim 1, further comprising:
    obtaining the spatial correlation matrix of the multiple transmitting antennas in the base station.

3. The method of claim 1, wherein determining an equivalent matrix further comprises:
    implementing singular value decomposition to the transmission matrix H of downlink channel to obtain $H=U\Sigma V^H$;
    obtaining the first m row vectors of conjugated and transport matrix $V^H$ of the right-side singular matrix V, obtained from the singular value decomposition, as the equivalent matrix $$\tilde{H} = \begin{pmatrix} v_1^H \\ \vdots \\ v_m^H \end{pmatrix}.$$

4. The method of claim 1, wherein determining an equivalent matrix further comprises:
    implementing singular value decomposition to the transmission matrix H of downlink channel to obtain $H=U\Sigma V^H$;
    obtaining the product of the first m row vectors of conjugated and transport matrix $V^H$ of right-side singular matrix V, obtained from singular value decomposition, and a diagonal matrix $\Sigma_m$ composed of m×m components of the first m columns and m rows of the diagonal matrix $\Sigma$, as the equivalent matrix $\tilde{H}$, $$\tilde{H} = \Sigma_m \begin{pmatrix} v_1^H \\ \vdots \\ v_m^H \end{pmatrix}.$$

5. The method of claim 1, wherein determining the approximately equivalent matrix based on the equivalent matrix further comprises:
    determining the approximately equivalent matrix $\tilde{\tilde{H}}$ according to the following expression:

$\tilde{\tilde{H}} = W_k^T R$ wherein R is the spatial correlation matrix of the multiple transmitting antennas in the base station, $W_k^T$ denotes the transposition of matrix $W_k$, $$W_k = \mathrm{argmax}_{w_k} \frac{\mathrm{trace}\{\mathrm{abs}(\tilde{H} R W_i^*)\}}{\|R W_i^*\|_F},$$

wherein, $W_i$ is the code word of the predetermined codebook and it is a two-dimensional $N_t$×m matrix, $W_i^*$ denotes the conjugation of matrix $W_i$, abs($\tilde{H}RW_i^*$) denotes a module of each component of matrix $\tilde{H}RW_i^*$, trace{abs($\tilde{H}RW_i^*$)} denotes the trace of matrix abs($\tilde{H}RW_i^*$), $\|RW_i^*\|_F$ denotes a Frobenius norm of matrix $RW_i^*$, and $\tilde{H}$ is the equivalent matrix,
    wherein the information concerning the approximately equivalent matrix comprises a subscript k of the code word $W_k$, and feeding back further comprises:
    feeding back the subscript k of the code word $W_k$ to the base station.

6. The method of claim 1, wherein the predetermined codebook comprises a feedback codebook defined in LTE release 8.

7. A method for precoding downlink data transmitted to a user terminal, at a base station, in a wireless communication network, the method comprising:
    receiving, from the user terminal, information concerning an approximately equivalent matrix of the transmission matrix of downlink channels from the base station to the user terminal;
    determining the approximately equivalent matrix based on the information concerning the approximately equivalent matrix, a predetermined codebook and a spatial correlation matrix of multiple transmitting antennas in the base station, wherein the information concerning the approximately equivalent matrix comprises a subscript k of the code word of the predetermined codebook;
    determining the approximately equivalent matrix according to the following expression:
    $\tilde{\tilde{H}} = W_k^T R$, wherein R is the spatial correlation matrix of the multiple transmitting antennas in the base station, k is the subscript of the code word of the predetermined codebook feed back by the user terminal, and $W_k$ is the code word of the predetermined codebook;

precoding downlink data transmitted to the user terminal with the approximately equivalent matrix.

8. The method of claim 7, wherein, precoding downlink data further comprises:
implementing singular value decomposition to the approximately equivalent matrix;
precoding the downlink data transmitted to the user terminal by selecting the first m column vectors of right-side singular matrix as the precoding matrix.

9. The method of claim 7, wherein the predetermined codebook comprises a feedback codebook defined in LTE release 8.

10. The method of claim 7, wherein said receiving and determining are performed for at least one other user terminal, and
said precoding further comprises precoding the downlink data transmitted to the user terminal with the approximately equivalent matrix of the terminal and further with the approximately equivalent matrix of said at least one other user terminal.

11. A feedback device for feeding back the information of downlink channels to a base station, in a user terminal, in a wireless communication network, the feedback device comprising:
a processor; and
memory storing instructions that, when executed, cause the feedback device to:
obtain a transmission matrix of downlink channels from the base station to the user terminal;
determine an approximately equivalent matrix of the transmission matrix of downlink channels, based on the transmission matrix of downlink channel, number of downlink data streams, a spatial correlation matrix of multiple transmitting antennas in the base station and predetermined codebook, wherein the number of the downlink data is m, there are $N_t$ transmitting antennas in the base station:
determine an equivalent matrix of the transmission matrix of downlink channels based on the transmission matrix of downlink channel and the number of downlink data streams, the equivalent matrix is a two-dimensional m×$N_t$ matrix;
determine the approximately equivalent matrix based on the equivalent matrix, the number of downlink data streams, the spatial correlation matrix and the predetermined codebook, the approximately equivalent matrix is a two-dimensional m×$N_t$ matrix;
feed the information concerning the approximately equivalent matrix back to the base station.

12. The feedback device of claim 11, wherein the memory stores further instructions to determine the approximately equivalent matrix $\tilde{\tilde{H}}$ according to the following expression:

$$\tilde{\tilde{H}} = W_k^T R$$

wherein R is the spatial correlation matrix of the multiple transmitting antennas in the base station, $W_k^T$ denotes the transposition of matrix $W_k$, $$W_k = \mathrm{argmax}_{W_k} \frac{\mathrm{trace}\{\mathrm{abs}(\tilde{H} R W_i^*)\}}{\|R W_i^*\|_F},$$

wherein $W_i$ is the code word of the predetermined codebook and is a two-dimensional $N_t$×m matrix, $W_i^*$ denotes the conjugation of matrix $W_i$, abs($\tilde{H}RW_i^*$) denotes a module of each component of matrix $\tilde{H}RW_i^*$, trace{abs($\tilde{H}RW_i^*$)} denotes the trace of matrix abs($\tilde{H}RW_i^*$), $\|RW_i^*\|_F$ denotes Frobenius norm of matrix $RW_i^*$, and $\tilde{H}$ is the equivalent matrix,
wherein the information concerning the approximately equivalent matrix comprises the subscript k of the code word $W_k$, and the memory stores further instructions to feed back the subscript k of the code word $W_k$ to the base station.

13. A precoding device for precoding downlink data transmitted to a user terminal, in the base station of wireless communication network, the precoding device comprising:
a processor; and
memory storing instructions that, when executed, cause the precoding device to receive from the user terminal the information concerning an approximately equivalent matrix of the transmission matrix of downlink channel from the base station to the user terminal;
determine an approximately equivalent matrix based on the information concerning the approximately equivalent matrix, a predetermined codebook and a spatial correlation matrix of multiple transmitting antennas in the base station, wherein the information concerning the approximately equivalent matrix comprises a subscript k of the code word of the predetermined codebook;
determine the approximately equivalent matrix according to the following expression:

$\tilde{\tilde{H}} = W_k^T R$, wherein R is the spatial correlation matrix of the multiple transmitting antennas in the base station, k is the subscript of the code word of the predetermined codebook feed back by the user terminal, and $W_k$ is the code word of the predetermined codebook;
precode downlink data transmitted to the user terminal with the approximately equivalent matrix.

14. The precoding device of claim 13, wherein the memory stores further instructions to receive from at least one other user terminal the information concerning an approximately equivalent matrix of the transmission matrix of downlink channel from the base station to that user terminal;
determine, respectively for the at least one other user terminal, an approximately equivalent matrix based on the information concerning the approximately equivalent matrix, a predetermined codebook and a spatial correlation matrix of multiple transmitting antennas in the base station; and
precode the downlink data transmitted to the user terminal with the approximately equivalent matrix of the terminal and further with the approximately equivalent matrix of each of said at least one other user terminal.

* * * * *